US011928169B2

(12) United States Patent
Ayyalasomayajula et al.

(10) Patent No.: US 11,928,169 B2
(45) Date of Patent: Mar. 12, 2024

(54) SYSTEM AND METHOD FOR IMPLEMENTING A FUNCTIONAL DOCUMENTATION MODULE

(71) Applicant: JPMorgan Chase Bank, N.A., New York, NY (US)

(72) Inventors: Sudheendra Ayyalasomayajula, Coatesville, PA (US); Raghuram Vudathu, Downingtown, PA (US); David Christopher Carey, Middletown, DE (US); Rajat Tandon, Chadds Ford, PA (US); Kelly Patrick Ernst, Wilmington, DE (US); Michael Polise, Philadelphia, PA (US); Cameron Boucher, Wilmington, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 19 days.

(21) Appl. No.: 16/834,000

(22) Filed: Mar. 30, 2020

(65) Prior Publication Data

US 2021/0049221 A1     Feb. 18, 2021

Related U.S. Application Data

(60) Provisional application No. 62/886,722, filed on Aug. 14, 2019.

(51) Int. Cl.
G06F 16/955     (2019.01)
G06F 3/0482     (2013.01)
(Continued)

(52) U.S. Cl.
CPC .......... *G06F 16/955* (2019.01); *G06F 3/0482* (2013.01); *G06F 11/3688* (2013.01);
(Continued)

(58) Field of Classification Search
CPC .. G06F 16/955; G06F 3/0482; G06F 11/3688; G06F 16/188; G06F 16/13; G06F 9/451
See application file for complete search history.

(56) References Cited

U.S. PATENT DOCUMENTS 6,493,733 B1 * 12/2002 Pollack ................. G06F 16/958
715/207
2003/0204637 A1 * 10/2003 Chong ..................... G06F 8/34
719/310

(Continued)

*Primary Examiner* — Cesar B Paula
*Assistant Examiner* — John M Heffington
(74) *Attorney, Agent, or Firm* — Greenblum & Bernstein, P.L.C.

(57) ABSTRACT

Various methods, apparatuses/systems, and media for implementing a functional documentation module are disclosed. A repository stores a list of URLs corresponding to one or more applications and a list independently executable programming languages for running an application. A receiver receives a request for creating a new URL. A processor causes a GUI to display selectable URLs from the list of URLs, selectable components from the list of independently executable programing languages, and a functional documentation; creates the new URL by selecting one or more desired URLs from the selectable URLs based on analyzing the functional documentation; independently tests only the created new URL for running the application without testing the selectable URLs and their underlying components; and updates the repository with the new URL based on a positive test result.

20 Claims, 4 Drawing Sheets

(51) Int. Cl.
  *G06F 11/36*    (2006.01)
  *G06F 9/451*    (2018.01)
  *G06F 16/13*    (2019.01)
  *G06F 16/188*   (2019.01)

(52) U.S. Cl.
  CPC .............. *G06F 9/451* (2018.02); *G06F 16/13* (2019.01); *G06F 16/188* (2019.01)

(56) References Cited

U.S. PATENT DOCUMENTS

2005/0259120 A1* 11/2005 Mansfield ............. G06F 16/957
  707/E17.119
2007/0276816 A1* 11/2007 Sample ................ G06F 16/951
2012/0042210 A1*  2/2012 Glaser ................ G06F 11/3684
  714/38.1
2019/0235998 A1*  8/2019 Fisher ................ G06F 11/3688

\* cited by examiner

SYSTEM AND METHOD FOR IMPLEMENTING A FUNCTIONAL DOCUMENTATION MODULE

CROSS-REFERENCE TO RELATED APPLICATIONS

This application claims the benefit of U.S. Provisional Application No. 62/886,722, filed Aug. 14, 2019, which is herein incorporated by reference in its entirety.

TECHNICAL FIELD

This disclosure generally relates to functional documentation, and, more particularly, to methods and apparatuses for implementing a functional documentation module for creating a uniform resource locator (URL) that exposes a web resource.

BACKGROUND

As software application becomes increasingly more complex, testing such software application also becomes more complex as a large number of unique combinations of paths and modules may be tested for each program. Conventional tools exist for software application testing. However, as the number of tests covering an application code increases the time to verify the correctness of the code increases as well because the conventional tools execute the entire suite of tests every time a change is made to a software application, thereby significantly increasing software application testing time, leading to a delay in getting useful feedback for developers, and wasting computer resources on build servers.

Currently, most applications may be built using one programming language or framework, and there may be a number of design patterns available to address issues relating to code complexity, verbosity, etc. However, this conventional approach of providing a plurality of design patterns may not address the underlying problems such as once a code is written for a software application, the patterns more often hinder than aid developers in diagnosing production issues. The concept of using multiple programming languages in a software application has been pioneered by several extract, transform, load (ETL) tools, but a developer may be usually locked into a clumsy system of drag and drop interfaces, and additionally, the developer may be constrained to a limited pre-defined set of features, thereby adding further complexities in testing every aspect of a typical software application when a new change is released. Moreover, the conventional ETL tools are generally used for batch processing (i.e., to generate a report) algorithm and are not used for Web application processing algorithm (i.e., updating a web site).

SUMMARY

The present disclosure, through one or more of its various aspects, embodiments, and/or specific features or sub-components, provides, among other features, various systems, servers, devices, methods, media, programs, and platforms for implementing a functional documentation module for creating a uniform resource locator (URL) that exposes a web resource and that allows a user to create easy to read functional documents, thereby significantly reducing application testing time, reducing utilization of computer resources, and reducing utilization of memory spaces thereby maintaining optimum memory spaces for other computer processing algorithms, but the disclosure is not limited thereto.

The various aspects, embodiments, features, and/or sub-components may also provide optimized processes of implementing a functional documentation module which may be configured to integrate several technologies that are commonly known to be industry standard, such as Spring Boot, Docker, Python, JSON into a cohesive package that may allow developers to create easy to read documentation for users, which may also serve as the basis for what the system may execute in the background, thereby always providing up to date functional documentation that may be readable by users, and at the same time not waste time writing the functional documentation because the system may use the same functional documentation in order to run an application in the background.

The various aspects, embodiments, features, and/or sub-components may further provide optimized processes of implementing a functional documentation module which may be configured to diagnose software failures much faster than conventional approach, independently test only the created new URL for running the application without testing all other URLs and their underlying components, reutilizing the components from other parts of the application or from different application without rearchitecting the entire application to create the new URL, thereby reducing utilization of computer resources and reducing utilization of memory spaces so that sufficient numbers of memory spaces may be available for other computer processing algorithms, but the disclosure is not limited thereto.

According to an aspect of the present disclosure, a method for implementing a functional documentation module for creating a uniform resource locator (URL) that exposes a web resource by utilizing one or more processors and one or more memories is disclosed. The method may include: providing a repository that stores a list of URLs corresponding to one or more applications and a list of independently executable programming languages for running an application; receiving a request for creating a new URL; causing a graphical user interface (GUI) to display selectable URLs from the list of URLs, selectable components from the list of independently executable programing languages, and a functional documentation that describes which components need to be executed in what order in response to the received request, wherein each component is an isolated piece of code that performs a task within the application; creating the new URL by selecting one or more desired URLs from the selectable URLs based on analyzing the functional documentation; independently testing only the created new URL for running the application without testing the selectable URLs and their underlying components; and updating the database with the new URL based on a positive test result.

According to another aspect of the instant disclosure, the method may further include: creating a new component for the application; updating the functional documentation with the new component; and storing the updated functional documentation onto the repository.

According to yet another aspect of the instant disclosure, the new URL may utilize the same components as the selectable URLs, and the executions of the components may be isolated by the URLs.

According to a further aspect of the instant disclosure, the method may further include capturing any failure, that happens in testing the new URL while executing, at a component level.

According to an additional aspect of the instant disclosure, the method may further include reutilizing the components from other parts of the application or from different application without rearchitecting the entire application to create the new URL.

According to another aspect of the instant disclosure, the method may further include utilizing the same component for both web processing and batch processing.

According to yet another aspect of the instant disclosure, the functional documentation may be human readable and may describe how a URL utilizes multiple components to provide an expected response.

According to a further aspect of the instant disclosure, the method may further include utilizing the new URL to access a web resource.

According to another aspect of the instant disclosure, a system for implementing a functional documentation module for creating a uniform resource locator (URL) that exposes a web resource is disclosed. The system may include: a repository that stores a list of URLs corresponding to one or more applications and a list of independently executable programming languages for running an application; a receiver that receives a request for creating a new URL: and a processor coupled to the repository and the receiver via a communication network, wherein the processor is configured to: cause a graphical user interface (GUI) to display selectable URLs from the list of URLs, selectable components from the list of independently executable programing languages, and a functional documentation that describes which components need to be executed in what order in response to the received request, wherein each component is an isolated piece of code that performs a task within the application; create the new URL by selecting one or more desired URLs from the selectable URLs based on analyzing the functional documentation; independently test only the created new URL for running the application without testing the selectable URLs and their underlying components; and update the database with the new URL based on a positive test result.

According to a further aspect of the instant disclosure, the processor may be further configured to: create a new component for the application; update the functional documentation with the new component; and store the updated functional documentation onto the repository.

According to yet another aspect of the instant disclosure, the processor may cause the new URL to utilize the same components as the selectable URLs, and executions of the components by the processor are isolated by the URLs.

According to an additional aspect of the instant disclosure, the processor may be further configured to: capture any failure, that happens in testing the new URL while executing, at a component level.

According to a further aspect of the instant disclosure, the processor may be further configured to: reutilize the components from other parts of the application or from different application without rearchitecting the entire application to create the new URL.

According to yet another aspect of the instant disclosure, the processor may be further configured to: utilize the same component for both web processing and batch processing.

According to another aspect of the instant disclosure, the processor may be further configured to: utilize the new URL to access a web resource.

According to yet another aspect of the present disclosure, a non-transitory computer readable medium configured to store instructions for implementing a functional documentation module for creating a uniform resource locator (URL) that exposes a web resource is disclosed. The instructions, when executed, cause a processor to perform the following: providing a repository that stores a list of URLs corresponding to one or more applications and a list of independently executable programming languages for running an application; receiving a request for creating a new URL; causing a graphical user interface (GUI) to display selectable URLs from the list of URLs, selectable components from the list of independently executable programing languages, and a functional documentation that describes which components need to be executed in what order in response to the received request, wherein each component is an isolated piece of code that performs a task within the application; creating the new URL by selecting one or more desired URLs from the selectable URLs based on analyzing the functional documentation; independently testing only the created new URL for running the application without testing the selectable URLs and their underlying components; and updating the database with the new URL based on a positive test result.

According to a further aspect of the instant disclosure, the instructions, when executed, may cause the processor to further perform the following: create a new component for the application; update the functional documentation with the new component; and store the updated functional documentation onto the repository.

According to yet another aspect of the instant disclosure, the instructions, when executed, may cause the processor to further perform the following: capture any failure, that happens in testing the new URL while executing, at a component level.

According to a further aspect of the instant disclosure, the instructions, when executed, may cause the processor to further perform the following: reutilize the components from other parts of the application or from different application without rearchitecting the entire application to create the new URL.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Figure 1:
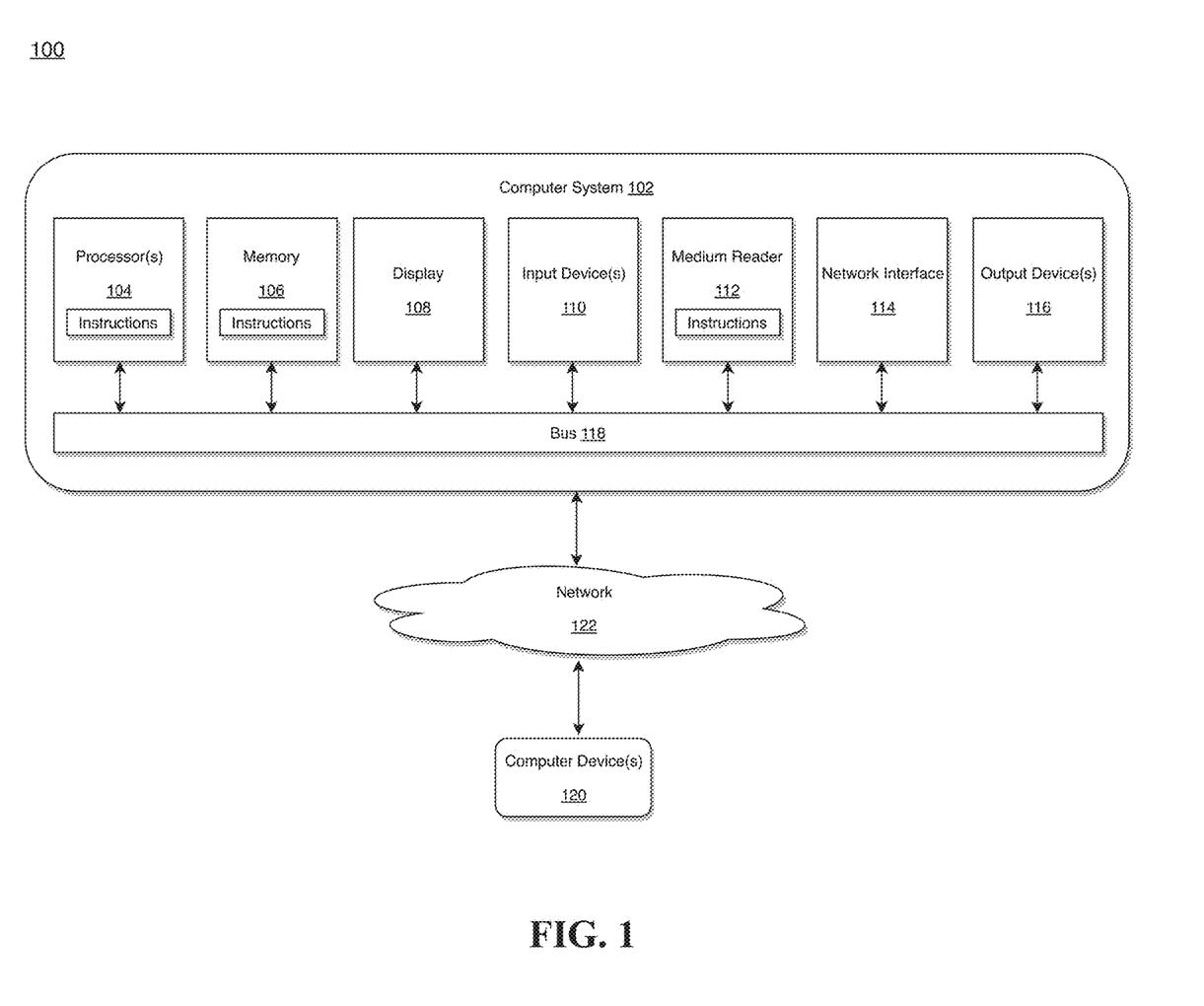
FIG. 1 illustrates a computer system for implementing a functional documentation module in accordance with an exemplary embodiment.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
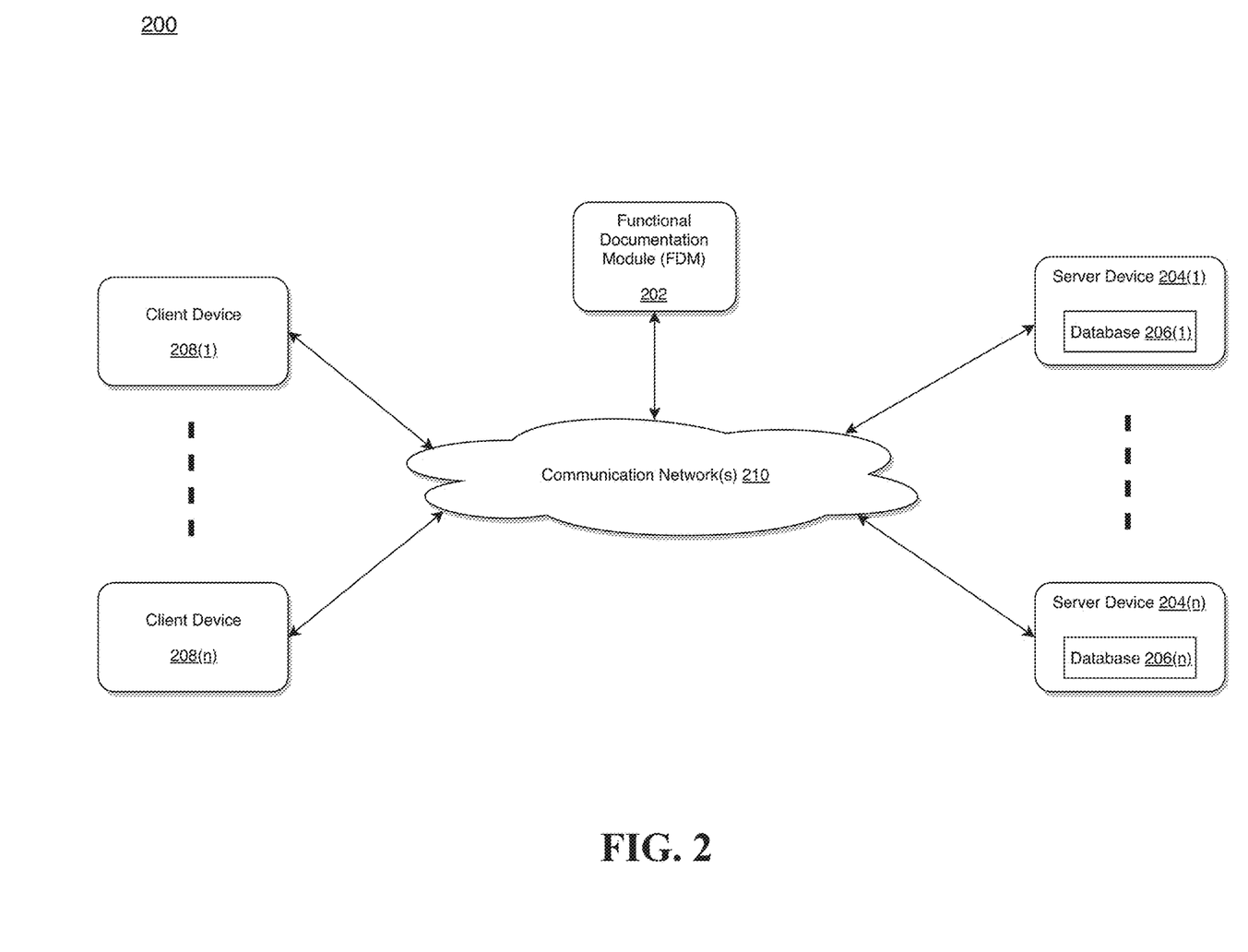
FIG. 2 illustrates an exemplary diagram of a network environment with a functional documentation module in accordance with an exemplary embodiment.

Referring to FIG. 2, a schematic of an exemplary network environment 200 for implementing a functional documentation module (FDM) of the instant disclosure is illustrated.

Conventional system, that does not implement an FDM of the instant disclosure, may not be able to execute testing of a software application in an efficient manner. Conventional tools may execute the entire suite of tests every time a change is made (even for the smallest change) to a source code of the software application, thereby significantly increasing software application testing time, leading to a delay in getting useful feedback for developers, and wasting computer resources on build servers.

According to exemplary embodiments, the above-described problems associated with conventional approach of testing software application may be overcome by implementing an FDM 202 as illustrated in FIG. 2 that may provide a platform for implementing the FDM 202 which may create a uniform resource locator (URL) that exposes a web resource and that allows a user to create easy to read functional documents, thereby significantly reducing application testing time, reducing utilization of computer resources, and reducing utilization of memory spaces thereby maintaining optimum memory spaces for other computer processing algorithms, but the disclosure is not limited thereto. The various aspects, embodiments, features, and/or sub-components may also provide optimized processes of implementing the FDM 202 which may be configured to diagnose software failures much faster than conventional approach, independently test only the created new URL for running the application without testing all other URLs and their underlying components, reutilizing the components from other parts of the application or from different application without rearchitecting the entire application to create the new URL, thereby reducing utilization of computer resources and reducing utilization of memory spaces so that sufficient numbers of memory spaces may be available for other computer processing algorithms, but the disclosure is not limited thereto.

The FDM 202 may be the same or similar to the computer system 102 as described with respect to FIG. 1.

The FDM 202 may store one or more applications that can include executable instructions that, when executed by the FDM 202, cause the FDM 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the FDM 202 itself, may be located in virtual server(s) running in a cloud-based computing environment rather than being tied to one or more specific physical network computing devices. Also, the application(s) may be running in one or more virtual machines (VMs) executing on the FDM 202. Additionally, in one or more embodiments of this technology, virtual machine(s) running on the FDM 202 may be managed or supervised by a hypervisor.

In the network environment 200 of FIG. 2, the FDM 202 is coupled to a plurality of server devices 204(1)-204(n) that hosts a plurality of databases 206(1)-206(n), and also to a plurality of client devices 208(1)-208(n) via communication network(s) 210. A communication interface of the FDM 202, such as the network interface 114 of the computer system 102 of FIG. 1, operatively couples and communicates between the FDM 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the FDM 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The FDM 202 may be a standalone device or integrated with one or more other devices or apparatuses, such as one or more of the server devices 204(1)-204(n), for example. In one particular example, the FDM 202 may be hosted by one of the server devices 204(1)-204(n), and other arrangements are also possible. Moreover, one or more of the devices of the FDM 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the FDM 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the FDM 202 that may efficiently provide a platform for implementing the FDM 202 which may be configured to diagnose software failures much faster than conventional approach, independently test only the created new URL for running the application without testing all URLs and their underlying components, reutilizing the components from other parts of the application or from different application without rearchitecting the entire application to create the new URL, thereby reducing utilization of computer resources and reducing utilization of memory spaces so that sufficient numbers of memory spaces may be available for other computer processing algorithms, but the disclosure is not limited thereto.

The client devices 208(1)-208(n) may run interface applications, such as standard web browsers or standalone client applications, which may provide an interface to communicate with the FDM 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the FDM 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the FDM 202, the server devices 204(1)-204(n), or the client devices 208(1)-208(n), for example, may be configured to operate as virtual instances on the same physical machine. For example, one or more of the FDM 202, the server devices 204(1)-204(n), or the client devices 208(1)-208(n) may operate on the same physical device rather than as separate devices communicating through communication network(s) 210. Additionally, there may be more or fewer FDMs 202, server devices 204(1)-204(n), or client devices 208(1)-208(n) than illustrated in FIG. 2. According to exemplary embodiments, the FDM 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
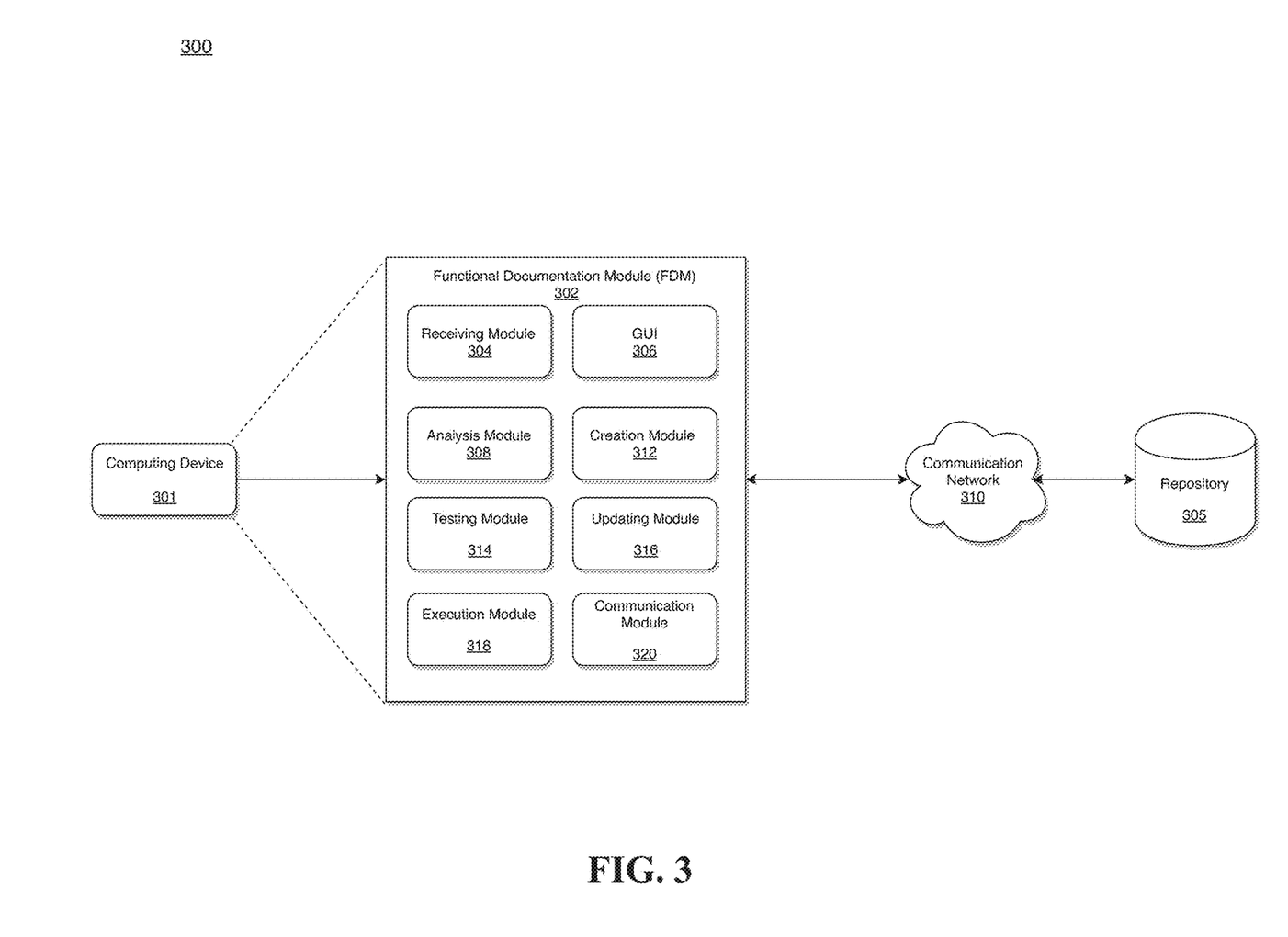
FIG. 3 illustrates a system diagram for implementing a functional documentation module in accordance with an exemplary embodiment.

FIG. 3 illustrates a system diagram for implementing a functional documentation module (FDM) in accordance with an exemplary embodiment. According to exemplary embodiments, a system 300 is described and shown in FIG. 3 as including an FDM 302 embedded within a computing device 301, although it may include other rules, policies, modules, databases, or applications, for example.

As will be described below, according to exemplary embodiments, the FDM 302 may be configured to diagnose software failures much faster than conventional approach, independently test only the created new URL for running the application without testing all URLs and their underlying components, reutilizing the components from other parts of the application or from different application without rearchitecting the entire application to create the new URL, thereby always providing up to date functional documentation that may be readable by users, and at the same time not waste time writing the functional documentation because the system may use the same functional documentation in order to run an application in the background, but the disclosure is not limited thereto. Thus, according to exemplary embodiments, a processor or a CPU implemented within the FDM 302 may not require persistent stores, in-memory caches, and extensive synchronizations, thereby additionally reducing software testing time, and reducing utilization of memory spaces, thereby improving efficiency of processing speed for other algorithms performed by the computing device 301 in parallel to software testing.

As shown in FIG. 3, an exemplary system 300 may include a computing device 301 within which the FDM 302 may be embedded, a repository (i.e., database) 305 which may store a list of uniform resource locators (URLs) corresponding to one or more applications and a list of independently executable programming languages for running an application, and a communication network 310 via which the computing device 301, the FDM 302, and the repository 305 are interconnected to exchange data. According to exemplary embodiments, a functional documentation may also be stored in the repository 305. The functional documentation may be human readable and may describe how a URL utilizes multiple components to provide an expected response. According to exemplary embodiments, each component may be an isolated piece of code that performs a task within the application. In addition, according to exemplary embodiments, a URL may be a component of another URL, but the disclosure is not limited thereto.

According to exemplary embodiments, the computing device 301 may be the same or equivalent to the computing device 208 as illustrated in FIG. 2, the repository 305 may include a memory (e.g., shown in FIG. 1) and may be the same or equivalent to the server 204 as illustrated in FIG. 2, and the communication network 310 may be the same or equivalent to the communication network 210 as illustrated in FIG. 2.

As shown in FIG. 3, the FDM 302 may include a receiving module 304, a graphical user interface (GUI) 306, an analysis module 308, a creation module 312, a testing module 314, an updating module 316, an execution module 318, and a communication module 320.

According to exemplary embodiments, each of the receiving module 304, the analysis module 308, the creation module 312, the testing module 314, the updating module 316, the execution module 318, and the communication module 320 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

In the case of the receiving module 304, the analysis module 308, the creation module 312, the testing module 314, the updating module 316, the execution module 318, and the communication module 320 being implemented by microprocessors or similar, they may be programmed using software (e.g., microcode) to perform various functions discussed herein and may optionally be driven by firmware and/or software.

Alternatively, each of the receiving module 304, the analysis module 308, the creation module 312, the testing module 314, the updating module 316, the execution module 318, and the communication module 320 may be implemented by dedicated hardware, or as a combination of dedicated hardware to perform some functions and a processor (e.g., one or more programmed microprocessors and associated circuitry) to perform other functions. Also, the receiving module 304, the analysis module 308, the creation module 312, the testing module 314, the updating module 316, the execution module 318, and the communication module 320 of the example embodiments may be physically separated into two or more interacting and discrete blocks, units and/or modules without departing from the scope of the inventive concepts. Further, the receiving module 304, the analysis module 308, the creation module 312, the testing module 314, the updating module 316, the execution module 318, and the communication module 320 of the example embodiments may be physically combined into more complex blocks, units and/or modules without departing from the scope of the present disclosure.

The process may be executed via the communication network 310, which may comprise plural networks as described above. For example, in an exemplary embodiment, the various components of the FDM 302 may communicate with the repository 305 via the communication module 320 and the communication network(s) 310. Of course, these embodiments are merely exemplary and are not limiting or exhaustive.

According to exemplary embodiments, the FDM 302 may be implemented into the computing device 301. The computing device 301 may be utilizes by a developer to create a new URL or modify existing URLs. The computing device 301 may also be utilized by other developers to further modify the newly created URL or other existing URLs. The computing device 301 may further be utilized by a user (i.e., a user who may not be considered an expert in coding or may have limited knowledge in coding) or any other user who may simply copy the URL and paste onto an address bar to access a web resource, but the disclosure is not limited thereto.

According to exemplary embodiments, the receiving module 304 may be configured to receive a request for creating a new URL. A processor embedded within the FDM 302 may cause the GUI 306 to display selectable URLs from the list of URLs, selectable components from the list of independently executable programing languages, and a functional documentation that describes which components need to be executed in what order in response to the received request. According to exemplary embodiments, each component may be an isolated piece of code that may perform a task within the application.

According to exemplary embodiments, the analysis module 308 may analyze the functional documentation to determine which URLs should be selected and which components should be selected that relate to creation of a new URL. The creation module 312 may create a new URL by selecting one or more desired URLs from the selectable URLs based on analyzing the functional documentation.

According to exemplary embodiments, the testing module 314 may independently test only the created new URL for running the application without testing all selectable URLs and their underlying components. According to exemplary embodiments, each component may be a Python script, but the disclosure is not limited thereto.

According to exemplary embodiments, when the testing module 314 returns a positive result indicating that the new URL does contain any errors, the repository 305 may be updated by adding the new URL to the list of already existing URLs. The new URL may be accessed by a user via the GUI 306 and the execution module 318 may execute the new URL to provide access to a web resource.

According to exemplary embodiments, the creation module 312 may be configured to create a new component for the application, the functional documentation may be updated with the new component, and the repository 305 may be updated by storing the updated functional documentation onto the repository 305. According to exemplary embodiments, the new URL may utilize the same components as the selectable URLs, and the execution module 318 may execute each component in accordance with corresponding URL. For example, executions of the components may be isolated by the URLs.

According to exemplary embodiments, testing module 314 may be configured to capture any failure, that happens in testing the new URL while executing by the execution module 318, at a component level, wherein the component may be an isolated piece of code that performs a task within the application. Thus, the testing module 314 does not need to run test for other components associated with the already existing URLs from the list of URLs accessed from the repository 305, thereby significantly reducing application testing time, reducing utilization of computer resources, and reducing utilization of memory spaces, but the disclosure is not limited thereto.

According to exemplary embodiments, the FDM 302 via the GUI 306 may provide a platform for reutilizing the components from other parts of the application or from different application without rearchitecting the entire application to create the new URL by the creation module 312, thereby significantly reducing time for modifying an application with the new URL.

According to exemplary embodiments, the FDM 302 may provide a platform for utilizing the same component for both web processing and batch processing. According to exemplary embodiments, web processing may refer to live processing. For example, when a user input some data by filling input form on any website, the input data may get processed in real time by accessing data from the repository 305. According to exemplary embodiments, batch processing may be utilized for massive and sequential records processing (i.e., report generation) and web processing may be utilized in concurrent updates (i.e., updating a website), but the disclosure is not limited thereto.

According to exemplary embodiments, the computing device 301 may include a memory (e.g., a memory 106 as illustrated in FIG. 1) which may be a non-transitory computer readable medium that may be configured to store instructions for implementing FDM 302 for creating a uniform resource locator (URL) that exposes a web resource. The computing device 301 may also include a medium reader (e.g., a medium reader 112 as illustrated in FIG. 1) which may be configured to read any one or more sets of instructions, e.g., software, from any of the memories described herein. The instructions, when executed by a processor embedded within the FDM 302 or the computing device 301, may be used to perform one or more of the methods and processes as described herein. In a particular embodiment, the instructions may reside completely, or at least partially, within the memory 106, the medium reader 112, and/or the processor 110 (see FIG. 1) during execution by the computing device 301.

For example, the instructions, when executed, may cause the processor 110 to perform the following: providing a repository that stores a list of URLs corresponding to one or more applications and a list independently executable programming languages for running an application; receiving a request for creating a new URL; causing a graphical user interface (GUI) to display selectable URLs from the list of URLs, selectable components from the list of independently executable programing languages, and a functional documentation that describes which components need to be executed in what order in response to the received request, wherein each component is an isolated piece of code that performs a task within the application; creating the new URL by selecting one or more desired URLs from the selectable URLs based on analyzing the functional documentation; independently testing only the created new URL for running the application without testing the selectable URLs and their underlying components; and updating the database with the new URL based on a positive test result.

According to exemplary embodiments, the instructions, when executed, may cause the processor 110 to further perform the following: create a new component for the application; update the functional documentation with the new component; and store the updated functional documentation onto the repository.

According to exemplary embodiments, the instructions, when executed, may cause the processor 110 further perform the following: capture any failure, that happens in testing the new URL while executing, at a component level.

According to exemplary embodiments, the instructions, when executed, may cause the processor 110 to further perform the following: reutilize the components from other parts of the application or from different application without rearchitecting the entire application to create the new URL.

According to exemplary embodiments, the instructions, when executed, may cause the processor 110 to further perform the following: cause the new URL to utilize the same components as the selectable URLs, and wherein executions of the components by the processor are isolated by the URLs.

According to exemplary embodiments, the instructions, when executed, may cause the processor 110 to further perform the following: utilize the same component for both web processing and batch processing.

According to exemplary embodiments, the instructions, when executed, may cause the processor 110 to further perform the following: utilize the new URL to access a web resource.

Figure 4:
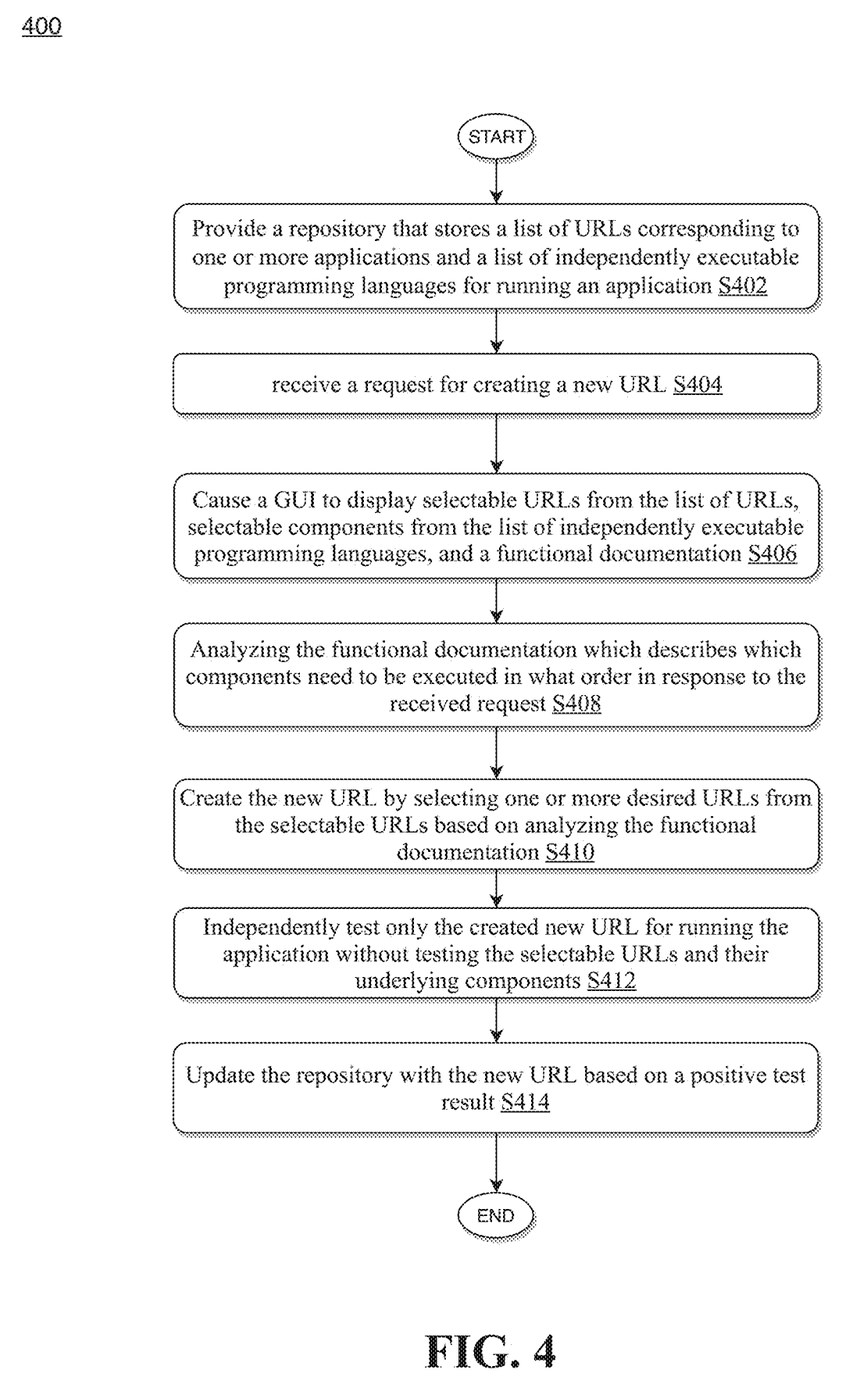
FIG. 4 illustrates a flow chart of a process for implementing a functional documentation module in accordance with an exemplary embodiment.

FIG. 4 illustrates a flow chart of a process 400 for implementing a functional documentation module in accordance with an exemplary embodiment. The functional documentation module may be the FDM 302 as illustrated in FIG. 3.

At step S402, a repository may be provided. According to exemplary embodiments, the repository may be the same or similar to the repository 305 as illustrated in FIG. 3. The repository may be configured to store a list of URLs corresponding to one or more applications, a list independently executable programming languages for running an application, and one or more functional documents.

At step S404, a request for creating a new URL may be received by a receiving module. According to exemplary embodiments, the receiving module may be the same or similar to the receiving module 304 as illustrated in FIG. 3.

At step S406, the FDM 302 may cause a graphical user interface (GUI) to display selectable URLs from the list of URLs, selectable components from the list of independently executable programing languages, and a functional documentation that describes which components need to be executed in what order in response to the received request. According to exemplary embodiments, the GUI may be the same or similar to the GUI 306 as illustrated in FIG. 3. According to exemplary embodiments, each component may be an isolated piece of code that performs a task within the application.

At step S408, the functional documentation may be analyzed by an analysis module. According to exemplary embodiments, the analysis module may be the same or similar to the analysis module 308 as illustrated in FIG. 3.

At step S410, the new URL may be created by a creation module by selecting one or more desired URLs from the selectable URLs based on analyzing the functional documentation. According to exemplary embodiments, the creation module may be the same or similar to the creation module 312 as illustrated in FIG. 3.

At step S412, only the created new URL for running the application may be independently tested by a testing module without testing the selectable URLs and their underlying components. According to exemplary embodiments, the testing module may be the same or similar to the testing module 314 as illustrated in FIG. 3.

At step S414, the repository may be updated with the new URL based on a positive test.

According to exemplary embodiments, the process 400 may further include: creating a new component for the application; updating the functional documentation with the new component; and storing the updated functional documentation onto the repository.

According to exemplary embodiments, in the process 400, the new URL may utilize the same components as the selectable URLs, and the executions of the components may be isolated by the URLs.

According to exemplary embodiments, the process 400 may further include capturing any failure, that happens in testing the new URL while executing, at a component level.

According to exemplary embodiments, the process 400 may further include reutilizing the components from other parts of the application or from different application without rearchitecting the entire application to create the new URL.

According to exemplary embodiments, the process 400 may further include utilizing the same component for both web processing and batch processing.

According to exemplary embodiments, in the process 400, the functional documentation may be human readable and may describe how a URL utilizes multiple components to provide an expected response.

According to exemplary embodiments, the process 400 may further include utilizing the new URL to access a web resource.

Thus, the exemplary embodiments disclosed herein with reference to FIGS. 1-4 may provide platforms for implementing a functional documentation module may be configured to diagnose software failures much faster than conventional approach, independently test only the created new URL for running the application without testing all URLs and their underlying components, reutilizing the components from other parts of the application or from different application without rearchitecting the entire application to create the new URL, thereby reducing utilization of computer resources and reducing utilization of memory spaces so that sufficient numbers of memory spaces may be available for other computer processing algorithms, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a functional documentation module for creating a uniform resource locator (URL) that exposes a web resource by utilizing one or more processors and one or more memories, the method comprising:
providing a repository that stores a list of URLs corresponding to one or more applications and a list that comprises selectable components of independently executable programming languages for running an application;
selecting the application to be run;
receiving a request for creating a new URL;
permitting a creation of functional documentation that integrates at least two technologies from among Spring Boot, Docker, Python, and JSON;
causing a graphical user interface (GUI) to display selectable URLs from the list of URLs, the selectable components from the list that comprises the selectable components of independently executable programming languages, and the functional documentation that describes which components need to be executed in what order in response to the received request, wherein each component is an isolated piece of code that performs a task within the application;
creating the new URL, that comprises at least one respectively piece of code that is underlying components for running the application, by selecting, by the one or more processors, one or more desired URLs from the selectable URLs based on analyzing the functional documentation;

utilizing the functional documentation to ensure that the underlying components of the new URL correctly include the components that need to be executed and a correct order for executing the components that need to be executed;

utilizing the functional documentation to run the application in a background of the functional documentation, the selectable components, and the selectable URLs, and utilizing the functional documentation to independently test only the created new URL and its underlying components for running the application without testing the selectable URLs and their underlying components;

updating the repository with the new URL based on a positive test result;

capturing any failure, that happens in testing the new URL while executing, at a component level, wherein each of the underlying components of the new URL is an isolated piece of code that performs a task within the application so that testing for other components associated with the already existing URLs from the list of URLs accessed from the repository is not necessary; and utilizing the same component for both web processing and batch processing and reutilizing the components from other parts of the application or from different application without rearchitecting the entire application to create the new URL, wherein the web processing is utilized in concurrent updates to a website.

2. The method according to claim 1, further comprising:
creating a new component for the application;
updating the functional documentation with the new component; and
storing the updated functional documentation onto the repository.

3. The method according to claim 1, wherein the new URL reutilizes selected components that have been selected from the selectable URLs, and
wherein executions of the selected components are isolated by the selectable URLs.

4. The method according to claim 1, wherein the functional documentation is human readable and describes how a URL utilizes multiple components to provide an expected response.

5. The method according to claim 1, further comprising:
utilizing the new URL to access a web resource.

6. The method according to claim 1, wherein a processor of the functional documentation does not utilize persistent stores, in-memory caches, and extensive synchronizations, and thereby the processor of the functional documentation improves processing of algorithms running in parallel to the testing.

7. The method according to claim 1, wherein the batch processing is utilized to generate at least one report by processing large sequential records.

8. A system for implementing a functional documentation module for creating a uniform resource locator (URL) that exposes a web resource, the system comprising:
a repository that stores a list of URLs corresponding to one or more applications and a list that comprises selectable components of independently executable programming languages for running an application;
a receiver that receives a request for creating a new URL; and
one or more processors coupled to the repository and the receiver via a communication network, wherein the one or more processors is configured to:
permit a creation of functional documentation that integrates at least two technologies from among Spring Boot, Docker, Python, and JSON;
cause a graphical user interface (GUI) to display selectable URLs from the list of URLs, the selectable components from the list that comprises selectable components of independently executable programming languages, and a functional documentation that describes which components need to be executed in what order in response to the received request, wherein each component is an isolated piece of code that performs a task within the application;
selecting the application to be run;
create the new URL, that comprises at least one respectively piece of code that is underlying components for running the application, by selecting, by the one or more processors, one or more desired URLs from the selectable URLs based on analyzing the functional documentation;
utilizing the functional documentation to ensure that the underlying components of the new URL correctly include the components that need to be executed and a correct order for executing the components that need to be executed;
utilizing the functional documentation to run the application in a background of the functional documentation, the selectable components, and the selectable URLs, and utilizing the functional documentation to independently test only the created new URL and its underlying components for running the application without testing the selectable URLs and their underlying components;
update the database with the new URL based on a positive test result;
capture any failure, that happens in testing the new URL while executing, at a component level, wherein each of the underlying components of the new URL is an isolated piece of code that performs a task within the application so that testing for other components associated with the already existing URLs from the list of URLs accessed from the repository is not necessary; and
utilizing the same component for both web processing and batch processing and reutilize the components from other parts of the application or from different application without rearchitecting the entire application to create the new URL, wherein the web processing is utilized in concurrent updates to a website.

9. The system according to claim 8, wherein the one or more processors is further configured to:
create a new component for the application;
update the functional documentation with the new component; and
store the updated functional documentation onto the repository.

10. The system according to claim 8, wherein the new URL reutilizes selected components that have been selected from the selectable URLs, and
wherein executions of the selected components by the one or more processors are isolated by the selectable URLs.

11. The system according to claim 8, wherein the functional documentation is human readable and describes how a URL utilizes multiple components to provide an expected response.

12. The system according to claim 8, wherein the one or more processors is further configured to:
utilize the new URL to access a web resource.

13. The system according to claim 8, wherein a processor of the functional documentation does not utilize persistent stores, in-memory caches, and extensive synchronizations, and thereby the processor of the functional documentation improves processing of algorithms running in parallel to the testing.

14. The system according to claim 8, wherein the batch processing is utilized to generate at least one report by processing large sequential records.

15. A non-transitory computer readable medium configured to store instructions for implementing a functional documentation module for creating a uniform resource locator (URL) that exposes a web resource, wherein, when executed, the instructions cause one or more processors to perform the following:
providing a repository that stores a list of URLs corresponding to one or more applications and a list that comprises selectable components of independently executable programming languages for running an application;
receiving a request for creating a new URL;
permitting a creation of functional documentation that integrates at least two technologies from among Spring Boot, Docker, Python, and JSON;
causing a graphical user interface (GUI) to display selectable URLs from the list of URLs, the selectable components from the list that comprises the selectable components of independently executable programming languages, and a functional documentation that describes which components need to be executed in what order in response to the received request, wherein each component is an isolated piece of code that performs a task within the application;
selecting the application to be run;
creating the new URL, that comprises at least one respectively piece of code that is underlying components for running the application, by selecting, by the one or more processors, one or more desired URLs from the selectable URLs based on analyzing the functional documentation;
utilizing the functional documentation to ensure that the underlying components of the new URL correctly include the components that need to be executed and a correct order for executing the components that need to be executed;
utilizing the functional documentation to run the application in a background of the functional documentation, the selectable components, and the selectable URLs, and utilizing the functional documentation to independently test only the created new URL and its underlying components for running the application without testing the selectable URLs and their underlying components;
updating the database with the new URL based on a positive test result;
capturing any failure, that happens in testing the new URL while executing, at a component level, wherein each of the underlying components of the new URL is an isolated piece of code that performs a task within the application so that testing for other components associated with the already existing URLs from the list of URLs accessed from the repository is not necessary; and
utilizing the same component for both web processing and batch processing and reutilizing the components from other parts of the application or from different application without rearchitecting the entire application to create the new URL, wherein the web processing is utilized in concurrent updates to a website.

16. The non-transitory computer readable medium according to claim 15, wherein the instructions, when executed, cause the one or more processors to further perform the following:
create a new component for the application;
update the functional documentation with the new component; and
store the updated functional documentation onto the repository.

17. The non-transitory computer readable medium according to claim 15, wherein the new URL reutilizes selected components that have been selected from the selectable URLs, and
wherein executions of the selected components are isolated by the selectable URLs.

18. The non-transitory computer readable medium according to claim 15, wherein the functional documentation is human readable and describes how a URL utilizes multiple components to provide an expected response.

19. The non-transitory computer readable medium according to claim 15, wherein the instructions, when executed, cause the one or more processors to further perform the following: utilizing the new URL to access a web resource.

20. The non-transitory computer readable medium according to claim 15, wherein the batch processing is utilized to generate at least one report by processing large sequential records.

* * * * *